(12) United States Patent
Bartone

(10) Patent No.: US 6,985,311 B2
(45) Date of Patent: Jan. 10, 2006

(54) CELLULAR TELEPHONE FLIP SCREEN MAGNIFIER

(75) Inventor: Jeffrey W. Bartone, Madison, CT (US)

(73) Assignee: Jeffrey W Brartone, Madison, CT (US)

( * ) Notice: Subject to any disclaimer, the term of this patent is extended or adjusted under 35 U.S.C. 154(b) by 0 days.

(21) Appl. No.: 10/826,818

(22) Filed: Apr. 16, 2004

(65) Prior Publication Data

US 2005/0231828 A1    Oct. 20, 2005

(51) Int. Cl.
*G02B 27/02* (2006.01)
*G04M 1/00* (2006.01)

(52) U.S. Cl. .................. 359/802; 359/803; 379/433.11; 379/433.13

(58) Field of Classification Search ................ 359/802, 359/803, 809, 811, 819, 440; 379/433.04, 379/433.11, 433.12, 433.13
See application file for complete search history.

(56) References Cited

U.S. PATENT DOCUMENTS 5,119,239 A * 6/1992 Iaquinto et al. ............. 359/811
6,151,172 A 11/2000 Ferraro
6,275,333 B1 8/2001 Shaffer
6,795,256 B2 * 9/2004 Wang .......................... 359/803

FOREIGN PATENT DOCUMENTS

| DE | 10233271 A1 | * | 8/2003 |
| JP | 2002323859 A | * | 11/2002 |
| KR | 2003019534 A | * | 3/2003 |
| WO | WO 2091338 A1 | * | 11/2002 |

* cited by examiner

*Primary Examiner*—Ricky Mack

(57) ABSTRACT

A flip screen magnifying system for a cellular telephone having a base portion and a top portion including an information screen. The base and top portions are hinged such that the top portion may be folded with the screen proximate the base portion in a closed position and opened to expose the base and the screen to the user in an opened position. A thin Fresnel lens magnifying film is secured to the top portion over the information screen by a pair of cantilever springs on opposite sides of the screen. The lens is movable between a contracted position proximate the screen in the telephone closed position, and a normally biased extended position spaced away from the screen to magnify information thereon in the telephone opened position. The lens may be manually adjustable to permit change of magnification when the telephone is in the opened position.

18 Claims, 4 Drawing Sheets

CELLULAR TELEPHONE FLIP SCREEN MAGNIFIER

BACKGROUND OF THE INVENTION

1. Field of the Invention

The present invention relates to a pop-up magnifying system for the information screen of a flip screen telephone or other electronic device having a folding information screen.

2. Description of Related Art

Flip-type cellular or wireless telephones are typically sized to be easily held in the user's hand and, in a closed position, be of a sufficiently small size to easily fit into the user's pocket. When open, such telephones reveal an information or viewing screen for displaying telephone numbers or other functions that, due to the size limitations of the telephone, generally tends to be relatively small. For those users with poor reading vision, the small screen size presents problems in viewing the characters on the screen in order to make calls and control other functions on the device. Magnifying lenses have been proposed to increase the viewability of the screen, for example as in U.S. Pat. Nos. 6,151,172 and 6,275,333. However, such lenses are relatively bulky and not suitable for flip type phones or other devices where the screen is folded between a base and lid. Accordingly, there is a need for a magnifier for flip-type cellular phones and other electronic devices having information screens which does not interfere with the use or closing of the device, yet which provides easy application and enhanced magnification of the screen.

SUMMARY OF THE INVENTION

Bearing in mind the problems and deficiencies of the prior art, it is therefore an object of the present invention to provide a magnifying system for flip-type wireless or cellular telephones and electronic devices.

It is another object of the present invention to provide a magnifying lens system that provides magnification to the information screen on a flip-type telephone or other electronic device, at a focal point extended away from the screen, yet does not interfere when the device may be closed.

A further object of the invention is to provide a magnifying lens for cellular or wireless telephones and other electronic devices which is easy to install and does not interfere with the use or storage of the device.

The above and other objects, which will be apparent to those skilled in art, are achieved in the present invention which is directed to a magnifying system for flip screen electronic devices having a base and lid portions hinged together, and including an information screen on one of the base or lid portions. The magnifying system includes a magnifying film or lens secured adjacent the screen and positioned thereover. The magnifying film or lens is relatively thin and is movable toward and away from the screen. When the base and lid portion of the device are in the closed position, the magnifying lens is in a contracted position proximate the screen between the base and lid. When the base and lid portion are in the opened position, the magnifying lens is in an extended position spaced away from the screen to magnify information thereon. Preferably, the magnifying lens is biased by a spring to pop-up automatically when the device is opened.

In another aspect, the present invention is directed to a telephone magnifying system comprising a telephone having an information screen and a magnifying film secured to the telephone, over the screen, by a flexible support and movable toward and away from the screen. The magnifying film is movable between a contracted support position proximate the screen and an extended support position spaced away from the screen to magnify information thereon when the telephone is in use. Preferably, the magnifying film comprises a Fresnel lens and the support comprises a spring between the magnifying film and telephone for biasing the magnifying film away from the screen when the telephone is in use.

In a further aspect, the present invention is directed to a flip screen telephone magnifying system comprising a telephone having a base portion and a top portion including an information screen. The base and top portions are hinged together such that the top portion may be folded with the screen proximate the base portion in a closed position and opened to expose the base and the screen to the user in an opened position. A magnifying lens is secured to the top portion over the screen and is movable toward and away from the screen. The magnifying lens is movable between a contracted position between the top portion and the base portion and proximate the screen in the telephone closed position, and an extended position spaced away from the screen to magnify information thereon in the telephone opened position.

The magnifying lens, which preferably comprises a magnifying film such as a Fresnel lens, may be manually adjustable to permit change of magnification when the telephone is in the opened position.

Preferably, the magnifying lens is normally biased away from the screen, when the telephone is in the opened position, by a spring between the magnifying lens and top portion. The spring may be secured on opposite sides of the magnifying film and opposite sides of the telephone top portion, and preferably comprises a pair of cantilever springs on opposite sides of the information screen.

The telephone top portion may include a speaker, and the magnifying lens is preferably configured such that the speaker is unimpeded by the magnifying lens when the film is moved to a position proximate the screen. The magnifying lens may biased such that the film may be contacted by a user's ear and moved to a position proximate the screen when the user places the top portion speaker against the user's ear when in the telephone opened position. The telephone top and bottom portions are also preferably unimpeded by the magnifying lens when the telephone is in the closed position.

In yet another aspect the present invention is directed to a method of magnifying the screen of a wireless telephone or other electronic device comprising providing an electronic device including an information screen on a surface thereof and affixing over the information screen a magnifying lens secured over the screen and movable toward and away from the screen. The lens is movable between a contracted position between the top portion and the base portion and proximate the screen and an extended position spaced away from the screen to magnify information thereon when the electronic device is in use.

Preferably the electronic device is a telephone having a base portion and a top portion including the information screen. The base and top are hinged together such that the top portion may be folded with the screen toward the base portion in a closed position and opened to expose the base and the screen to the user in an opened position. The magnifying lens is secured to the top portion over the screen and movable toward and away from the screen, such that the lens is movable between a contracted position between the top portion and the base portion and proximate the screen in the telephone closed position and an extended position spaced away from the screen to magnify information thereon in the telephone opened position.

The magnifying lens may include a flexible support and be movable between a contracted support position wherein the magnifying lens is proximate the screen and an extended support position wherein the magnifying lens is spaced away from the screen. The method may include affixing the support to the telephone top portion, adjacent the information screen, with an adhesive. The magnifying lens and spring may otherwise be as described previously.

Where the magnifying film initially has a length in excess of a vertical length of the information screen, the method may further include trimming off a portion of the magnifying film below the information screen. Wherein the telephone has a speaker adjacent the information screen, the method may include contacting the magnifying lens with a user's ear and moving the lens to a position proximate the screen when the user places the telephone speaker against the user's ear when the telephone is in use.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–10 of the drawings in which like numerals refer to like features of the invention.

Figure 1:
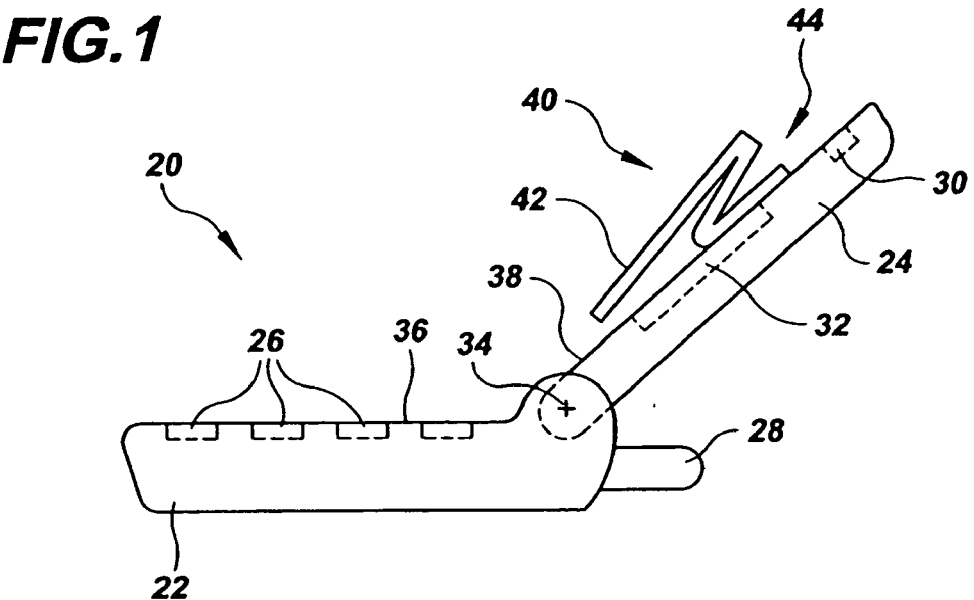
FIG. 1 is a side-elevational view of a flip-type cellular telephone, in the opened position, having the preferred magnification system of the present invention.

The preferred embodiment of the present invention is shown in FIGS. 1–7 in connection with a otherwise conventional flip-type cellular or wireless telephone 20. As shown in FIG. 1 in the open position, and in FIG. 3 in the closed position, cellular telephone 20 includes a base portion having numeric and other control keys 26 on a top surface 36 and, connected by a hinge 34, a top or lid portion 24 having an LED or other information screen 32 on a top surface 38. Adjacent the information screen, on the side away from the hinge, is a speaker 30.

Figure 5:
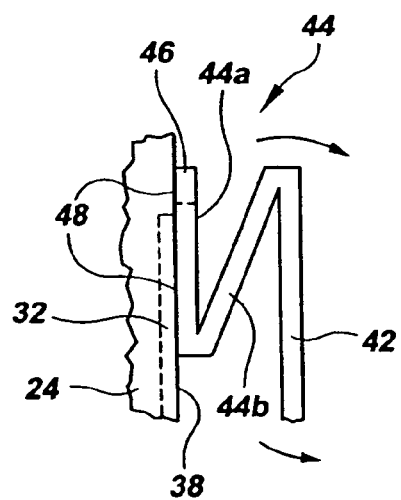
FIG. 5 is a side elevational view showing the preferred support for the magnifying film, shown in the normally extended position.
Figure 6:
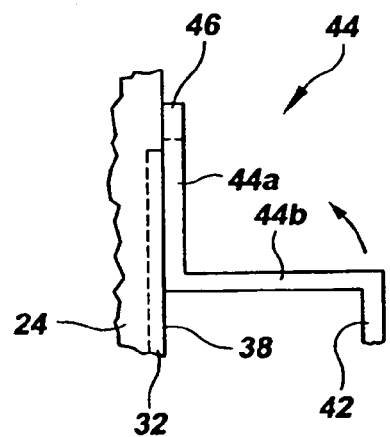
FIG. 6 is a side elevational view of the support of FIG. 5, shown in the manually full extended position.

To provide a magnifying function to the otherwise generally small characters on information screen 32, the magnifying lens system 40 of the present invention preferably comprises a thin magnifying film 42 secured to the telephone adjacent the information screen by a flexible support 44. As shown most clearly in FIGS. 5 and 6, flexible support 44 comprises a double cantilever-type spring having legs 44a and 44b connected to one end of magnifying film 42. Spring support 44 is biased in an extended position as shown in FIG. 5, wherein it normally and automatically pops up when lid 38 is opened and supports magnifying film 42 at a desired magnifying distance from screen 32. This magnifying distance may be determined by the focal point of the magnifying film and the needs of the user. Preferably, the support spring 44 may be manually moved, and the magnifying film 42 extended, in the direction shown by the arrows in FIG. 5 to a further extended position as shown in FIG. 6. In this fully extended position, the distance of the magnifying film 42 from the screen and 32, is determined by the length of cantilever spring leg 44b, e.g., ½ in. When the user releases the magnifying film, it will spring back in the direction of the arrows shown to the normally biased position shown in FIG. 5. While the screen 42 when in the normally biased, extended position of FIGS. 1 and 5 will preferably have the magnifying film parallel to the surface of the information screen 32, it may also be positioned be at an angle, as shown in FIG. 1, without detrimentally affecting the enhanced viewing of the screen. The user may easily adjust the angle of the magnifying film 42 film by hand if desired.

The magnifying film may be any conventional lens, such as a convex lens of glass or plastic, but is preferably a thin, flat, lightweight plastic Fresnel lens. As is well known, a Fresnel lens is a thin optical lens consisting of many small, narrow concentric grooves on the surface of a plastic sheet. While a conventional convex magnifying lens is thick at the center, the Fresnel lens reproduces the surface curvature of the convex lens in sections, with each groove having slightly different angle than the next and with same focal length to focus the light toward the center of point. Each groove can be considered as an individual small lens to bend parallel light and focus it, maintaining the same focal length with a fraction of the thickness and weight.

A preferred magnifying film is the HL-100 Handi Lens plastic Fresnel lens available from Ultra Optics of East Haven, Conn. Typical thickness for use with a conventional flip-type cellular telephone is 1/16 in., which provides approximately 2× magnification. The support spring is preferably made from plastic and has the same thickness as the magnifying film. Preferred thickness limits for the magnifying film and support spring are from about 1/32 in to about 1/8 in.

Figure 2:
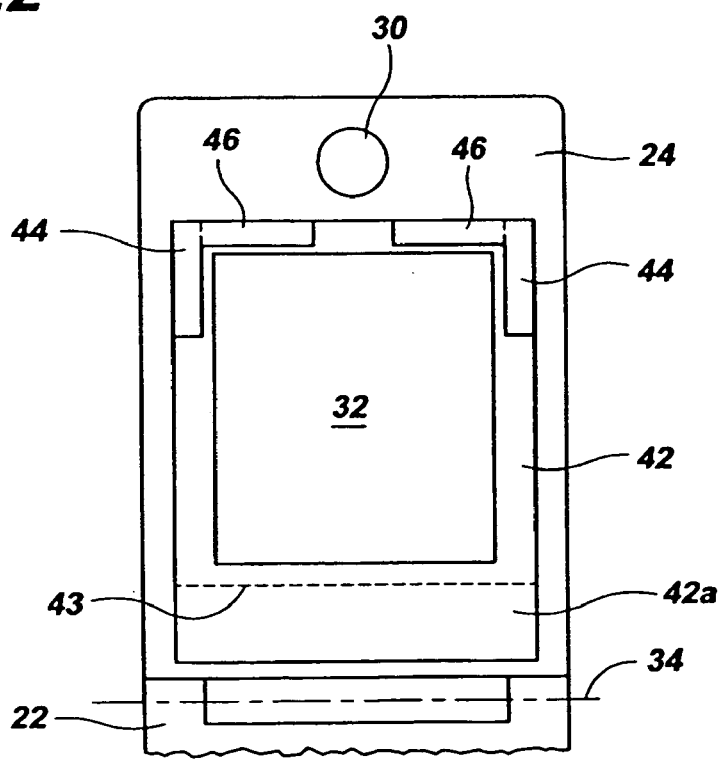
FIG. 2 is a front elevational view of the lid portion of the cellular telephone of FIG. 1 showing the information screen and the preferred magnifying film of the present invention affixed thereover.

Springs 44 may be adhered to the magnifying film or may be formed from the same material and integral therewith. Optionally, an adhesive tape may be applied to the springs to provide additional strength and support. To readily attach the magnifying film system 40 to the device 20, there may be provided an adhesive 48, preferably in the form of an adhesive film such as double stick tape, on cantilever spring leg 44a so that it may be adhered to the surface 38 of the device adjacent screen 24. For additional support, the cantilever support leg 44a may be supplied with a transverse portion 46, forming an L shape, which also includes adhesive to secure to the surface 38 adjacent the information screen. The opposing L-shapes of the supports provide a template to easily locate and secure the magnifying film on the telephone. In this manner, the upper portion of the magnifying film 42 is supported on both the sides and top of along and adjacent to the upper portion of screen 32, as shown in FIG. 2. The adhesive film 48 on the spring portions may be protected before application by a quick release film. Once the user secures the magnifying film support to the device adjacent the screen, any excess magnifying film portion 42a below the information screen 32 may be trimmed off by cutting along desired line 43. In order to accommodate various sizes of the devices, the magnifying film is normally provided with such excess length since it may be easily trimmed with scissors when in its preferred embodiment as a plastic Fresnel lens.

Figure 3:
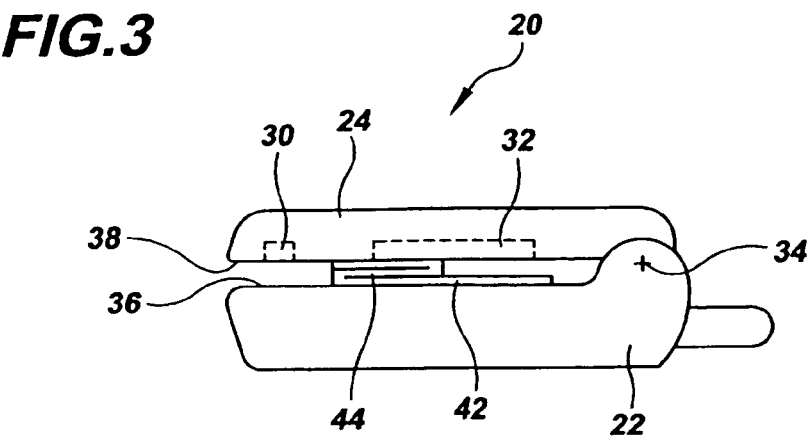
FIG. 3 is a side elevational view of the cellular telephone of FIG. 1 in the closed position, with the magnifying film in a contracted position between the base and lid.
Figure 4:
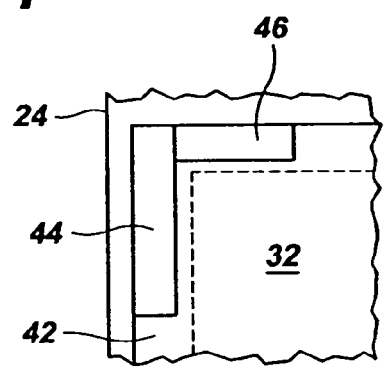
FIG. 4 is a front elevational view showing a close-up of the spring support portion of the magnifying film depicted in FIG. 2.

As a result of its unique configuration, the magnifying lens system of the present invention does not substantially interfere with closure of the flip-type telephone 20, as shown in FIG. 3. The spring supports 44 are compressed to a collapsed position against one another and magnifying film 42. Because of the relatively small thickness of the film and support, normally on the order of no more than about 1/8 in., the lid portion 24 may be closed in its normal position against base portion 22.

When the flip-type telephone is in the opened position of FIG. 1, the magnifying film 42 pops up, and user holds the base portion in his hand and uses the key pad and now-magnified information screen to dial the number or access any other telephone function. Spring support 44 normally biases the magnifying film away from the screen, typically at a distance of about 1/4 in. to provide a minimum magnification of approximately 2×. In the example shown, the magnifying film may be further manually extended away from the screen to a distance of approximately 1/2 in.

Figure 7:
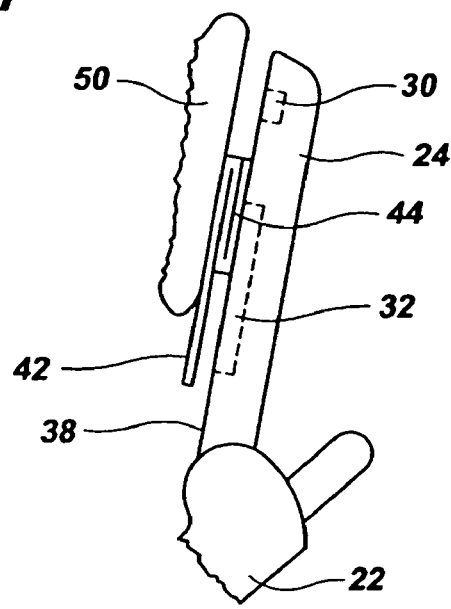
FIG. 7 is a side elevational view of the top portion of the flip-type cellular phone of FIG. 1 showing the contraction of the magnifying film when a user's ear is pressed against the speaker portion.

Further, the magnifying lens system of the present invention does not interfere with the telephone speaker. When the telephone is in use, the user places the speaker in the lid portion against his ear 50, as shown in FIG. 7. Because of the flexibility of support 44, the magnifying film 42 may be readily contracted by the user's ear into its position proximate screen 32 to permits easy hearing from the speaker, without any interference.

Figure 8:
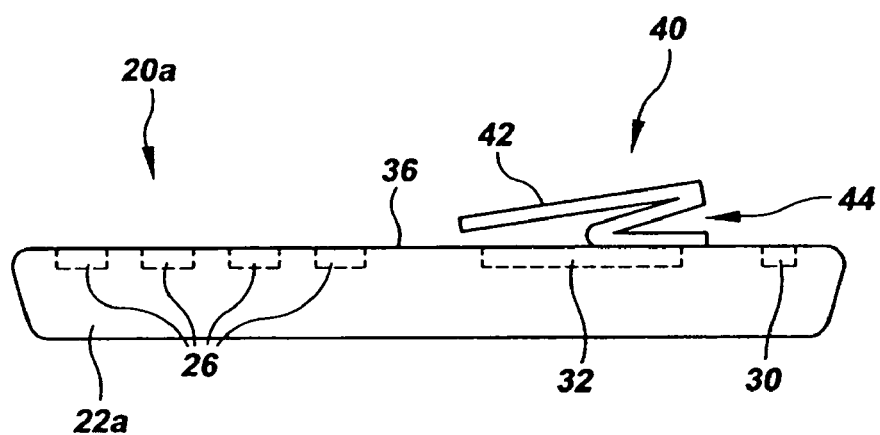
FIG. 8 is a side elevational view of the magnifying film system of the present invention in use on a non-flip type telephone.
Figure 9:
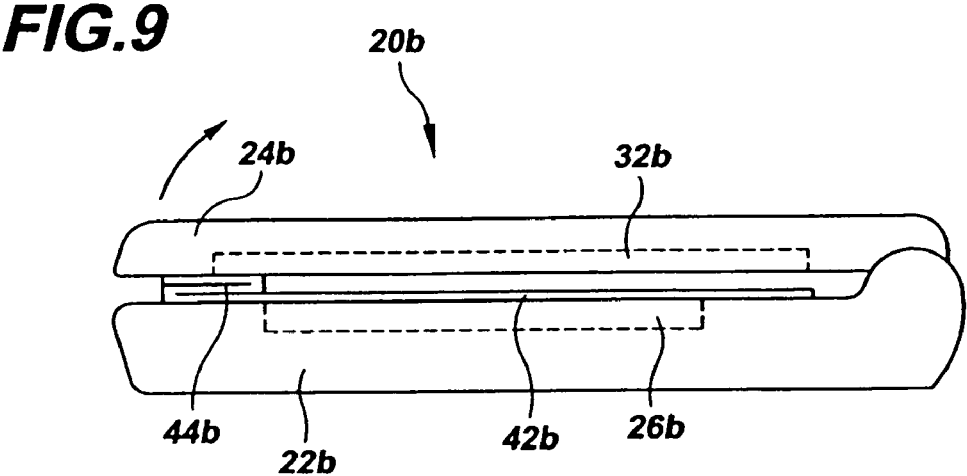
FIG. 9 is a side elevational view of the magnifying view system of the present invention in use over the screen of a laptop computer, when the top is in the closed position.
Figure 10:
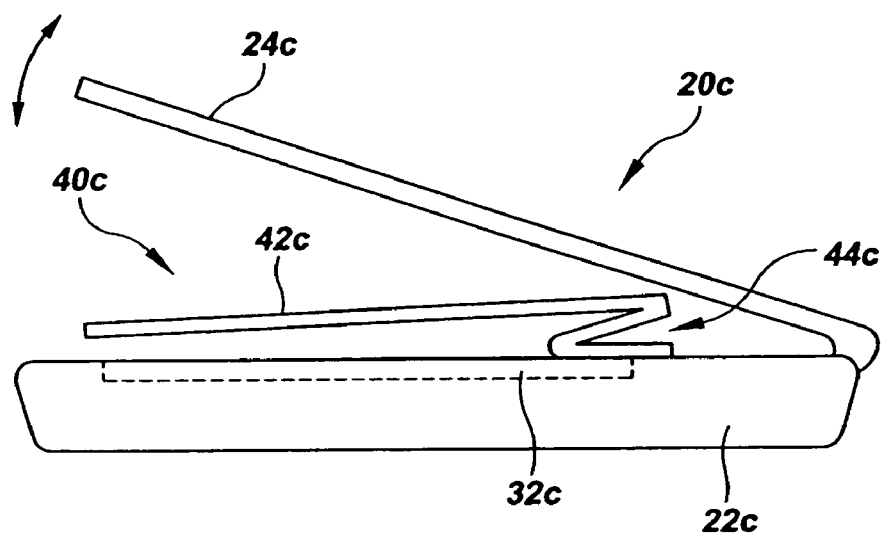
FIG. 10 is a side elevational of the magnifying film of the present invention in use over the screen of a personal digital assistant (PDA) device, when the top portion is partially closed.

The use of the magnifying film system of the present invention is depicted with other devices in FIGS. 8 through 10. In FIG. 8, the magnifying film 42 and spring supports 44 are secured adjacent the information screen 32 of a conventional cell phone 20a having a non-folding base 22a. In FIG. 9, the magnifying film system is depicted on a laptop computer 20b, having a base 22b with keyboard 26 therein, and a flip-opening top lid 24b having a screen 32b therein. The magnifying film of the present invention comprises spring support 44b which supports a magnifying film 42b, of the same type described previously. When the laptop is in the closed position as shown, with the lid and screen folded down over the base and keyboard, the magnifying film system is of minimal thickness and does not interfere with closure. When the laptop lid 24b is open in the direction of the arrow as shown, the support 44b will pop up and bias the magnifying film 42b outward, as described previously in connection with the cellular telephone.

FIG. 10 shows the use of the magnifying film of the present invention in connection with a personal digital assistant (PDA) 20c having a base 22c and a flip-type lid 24c. The magnifying film system 40c comprises magnifying film 42c and support spring 44c applied adjacent the information screen on the top surface of base 22c. When the lid is flipped to the open position, again the spring 44c biases the magnifying film away from screen 32c, to magnify the images thereon. When the lid 24c is flipped downward against the base 22c, again the minimal thickness of the magnifying film system does not interfere with the closure of the device.

Accordingly the present invention provides an easily applied visual aid which may be used on all flip-type cellular telephones display screen and for other electronic devices having information screens. It may be used in particular for such devices having a flip-type lid and base, where the screen is either in the lid or the base. The pop-up biasing feature of the spring support allows for automatic focal point at a minimum magnification when the device is in use. It further permits manual adjustment away or closer to the screen for focal point change and maximum magnification as desired. The lens retracts in a position approximate the screen and does not substantially interfere when the device is closed.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A flip screen telephone magnifying system comprising:
   a telephone having a base portion and a top portion including an information screen, the base and top being hinged together such that the top portion may be folded with the screen proximate the base portion in a closed position and opened to expose the base and the screen to the user in an opened position;
   a magnifying lens secured to the top portion over the screen and movable toward and away from the screen, the magnifying lens being movable between a contracted position between the top portion and the base portion and proximate the screen in the telephone closed position and an extended position spaced away from the screen to magnify information thereon in the telephone opened position; and
   a spring between the magnifying lens and top portion for biasing the magnifying lens away from the screen when the telephone is in the opened position, the spring comprising a pair of cantilever springs on opposite sides of the information screen.

2. The magnifying system of claim 1 wherein the spring is secured on opposite sides of the magnifying film.

3. The magnifying system of claim 1 wherein the top portion includes a speaker and wherein the magnifying lens is biased such that the film may be contacted by a user's ear and moved to a position proximate the screen when the user places the top portion speaker against the user's ear when in the telephone opened position.

4. The magnifying system of claim 1 wherein the top portion includes a speaker and wherein the magnifying lens is configured such that the speaker is unimpeded by the magnifying lens when the film is moved to a position proximate the screen.

5. The magnifying system of claim 1 wherein the telephone top and bottom portions are unimpeded by the magnifying lens when the telephone is in the closed position.

6. The magnifying system of claim 1 wherein the magnifying lens is manually adjustable to permit change of magnification when the telephone is in the opened position.

7. The magnifying system of claim 1 wherein the magnifying lens comprises a magnifying film.

8. The magnifying system of claim 1 wherein the magnifying lens comprises a Fresnel lens.

9. The magnifying system of claim 1 wherein the magnifying lens is normally biased away from the screen when the telephone is in the opened position.

10. A method of magnifying the screen of a wireless telephone comprising:
  providing a telephone including an information screen on a surface thereof, the telephone having a base portion and a top portion including the information screen, the base and top being hinged together such that the top portion may be folded with the screen toward the base portion in a closed position and opened to expose the base and the screen to the user in an opened position; and
  affixing over the information screen on the telephone a magnifying lens secured to the top portion over the screen and movable toward and away from the screen, wherein the lens is movable between a contracted position between the top portion and the base portion and proximate the screen in the telephone closed position, and an extended position spaced away from the screen to magnify information thereon when the telephone is in use in the telephone opened position.

11. The method of claim 10 wherein the magnifying lens includes a spring for biasing the magnifying lens away from the screen when the telephone is in the opened position, and including affixing the spring to the telephone top portion adjacent the information screen.

12. The method of claim 11 wherein the wherein the spring comprises a pair of cantilever springs for affixing the magnifying lens at opposite sides of the information screen.

13. The method of claim 12 wherein the magnifying film initially has a length in excess of a vertical length of the information screen, and further including trimming off a portion of the magnifying film.

14. The method of claim 10 wherein the magnifying lens comprises a magnifying film.

15. The method of claim 14 wherein the magnifying film initially has a length in excess of a vertical length of the information screen, and further including trimming off a portion of the magnifying film below the information screen.

16. The method of claim 10 wherein the magnifying lens comprises a Fresnel lens.

17. The method of claim 10 wherein the magnifying lens includes a flexible support and movable between a contracted support position wherein the magnifying lens is proximate the screen and an extended support position wherein the magnifying lens is spaced away from the screen, and including affixing the support to the telephone top portion, adjacent the information screen, with an adhesive.

18. The method of claim 10 wherein the telephone has a speaker adjacent the information screen, and including contacting the magnifying lens with a user's ear and moving the lens to a position proximate the screen when the user places the telephone speaker against the user's ear when the telephone is in use.

* * * * *